US009860894B2

(12) United States Patent
Liu et al.

(10) Patent No.: US 9,860,894 B2
(45) Date of Patent: Jan. 2, 2018

(54) WIRELESS BACKHAUL SYSTEM

(71) Applicant: Commonwealth Scientific and Industrial Research Organisation, Campbell (AU)

(72) Inventors: Ren Ping Liu, Marsfield (AU); Antonio Cantoni, City Beach (AU); John Matthews, Marsfield (AU)

(73) Assignee: Commonwealth Scientific and Industrial Research Organisation, Campbell (AU)

( * ) Notice: Subject to any disclaimer, the term of this patent is extended or adjusted under 35 U.S.C. 154(b) by 0 days.

(21) Appl. No.: 14/648,465

(22) PCT Filed: Nov. 30, 2012

(86) PCT No.: PCT/AU2012/001470
§ 371 (c)(1),
(2) Date: May 29, 2015

(87) PCT Pub. No.: WO2014/082114
PCT Pub. Date: Jun. 5, 2014

(65) Prior Publication Data
US 2015/0305026 A1    Oct. 22, 2015

(51) Int. Cl.
*H04J 3/00* (2006.01)
*H04W 72/04* (2009.01)
(Continued)

(52) U.S. Cl.
CPC ......... *H04W 72/0446* (2013.01); *H04L 5/001* (2013.01); *H04L 5/0064* (2013.01); *H04L 25/14* (2013.01); *H04L 47/34* (2013.01)

(58) Field of Classification Search
CPC .... H04W 72/0446; H04L 47/34; H04L 25/14; H04L 5/0064; H04L 5/001
See application file for complete search history.

(56) References Cited

U.S. PATENT DOCUMENTS 8,265,096 B2   9/2012   Zheng et al.
8,369,425 B2   2/2013   Bai et al.
(Continued)

FOREIGN PATENT DOCUMENTS

CN    101360077 B    10/2012
EP      1953982 A1    8/2008
WO    2010093862      8/2010

OTHER PUBLICATIONS

Australian Patent Office, International Search Report International Application No. PCT/AU2012/001470, Feb. 11, 2013.
(Continued)

*Primary Examiner* — Afshawn Towfighi
(74) *Attorney, Agent, or Firm* — Wood Herron & Evans LLP (57) ABSTRACT

Disclosed is a method of transmitting data over a plurality of wireless frequency bands between a transmitter and a receiver during one of a plurality of rounds, the method comprising: computing a target spacing in time between a start time of transmission in a first band and a start time of transmission in a second band dependent on a first data rate in the one round and in the first band; commencing transmitting, by the transmitter, a first frame of data over the first band at the first data rate; waiting for the computed target spacing to elapse, and then commencing transmitting, by the transmitter, a second frame of data over the second hand at a second data rate.

18 Claims, 8 Drawing Sheets

(51) Int. Cl.
  *H04L 5/00*    (2006.01)
  *H04L 25/14*   (2006.01)
  *H04L 12/801*  (2013.01)

(56) References Cited

U.S. PATENT DOCUMENTS

| | | |
|---|---|---|
| 2010/0093862 A1 | 4/2010 | Torigoe et al. |
| 2010/0323685 A1 | 12/2010 | Lopez et al. |
| 2012/0243638 A1* | 9/2012 | Maltsev ............ H04W 72/0453 375/316 |
| 2013/0343211 A1 | 12/2013 | Liu et al. |

OTHER PUBLICATIONS

IP Australia, Examination report No. 1 for standard patent application No. 2012395740 dated Nov. 23, 2016 (2 pages).
IP Australia, Examination report No. 2 for standard patent application No. 2012395740 dated Mar. 22, 2017 (3 pages).
IP Australia, Examination report No. 3 for standard patent application No. 2012395740 dated May 31, 2017 (4 pages).
European Patent Office, European Search Report issued in related EP Application No. 12889293.9, dated Jun. 14, 2016 (6 pages).
International Search Authority, Search Report and Written Opinion issued in International Application No. PCT/AU2012/001470, dated Feb. 11, 2013 (10 pages).
International Searching Authority, Written Opinion and Search Report issued in International Applicaiton No. PCT/AU2015/000579 dated Dec. 10, 2015 (12 pages).

\* cited by examiner

WIRELESS BACKHAUL SYSTEM

FIELD

The present invention relates generally to wireless communications and in particular to multi-band backhaul arrangements in wireless communication systems.

BACKGROUND

High speed broadband networks have been growing rapidly in the last few decades. With the advance of wireless communications technologies, new broadband wireless access (BWA) networks offering 100 Megabits per second (Mbps) to 1 Gigabits per second (Gbps) data rates are on the horizon. The emerging BWA networks pose major challenges to backhaul; that is, the connection of the wireless access points for users of the BWA network to a larger wired network (such as the Internet). In countries with large geographical areas of low population density, such as Australia, high data rate wireless backhaul is necessary to bring broadband services to remote areas economically.

One of the major challenges in wireless backhaul is to achieve both high data rates and long distance. The former demands a large bandwidth in the order of GHz, and the latter requires that the system operate at microwave frequencies rather than the higher millimeter-wave frequencies. Whilst a large contiguous bandwidth is rarely available at microwave frequencies for use in wireless backhaul, there are usually some disjoint bands and sub-bands available. For example, in Australia, such bands are presently available at 6, 6.7, 8, and 11 GHz. These bands may be aggregated to increase transmission capacity and thus obtain the required GHz bandwidth. Link aggregation, or striping, was originally employed for wired digital circuit aggregation, and was soon integrated in ATM, Ethernet, IP, and TCP networks. More recently, there has been interest in wireless striping.

One requirement of striping is that it be transparent to upper communication layers in the Open Systems Interconnection (OSI) model. Preservation of data order is one of the most important transparency requirements. However, when a traffic stream is striped across multiple links, its data may be received out of order at the receiver because of different delays in different stripe links. Most previous approaches deal with out-of-order arrivals by numbering the data packets at the transmitter node with a sequence number. This sequence number can then be used at the receiver node to sort the packets back into order. However, such reordering significantly increases the upper bound on the overall striping delay. Additionally, data packets need to be modified to carry sequence numbers, and a reordering buffer has to be used to store out-of-order packets, significantly increasing cost. Moreover, in certain applications, sequence numbers cannot be added due to packet size or hardware restrictions.

In-sequence striping, or FIFO delivery, can avoid the costs of reordering. However, existing FIFO delivery techniques are unable to achieve "work-conserving". Work-conserving means that no link is idle when there is data that could be sent through that link. Since link aggregation is often used to overcome communication bottlenecks, it is advantageous that all the links are fully utilized to maximize the throughput and minimize the delay through the aggregated channel.

There are additional difficulties for implementing striping in multi-band wireless backhaul systems. First, the band data rate may be different (heterogeneous) for different bands depending on the available spectrum bandwidth on that band. Second, the band data rate may be time varying, since the modulation and coding level in a band is often made adaptive to time-varying channel quality.

SUMMARY OF INVENTION

It is an object of the present invention to overcome, or at least ameliorate, one or more of the above disadvantages of a striped wireless backhaul communication link.

Disclosed is a striped wireless backhaul communication system that achieves both work-conserving and in-sequence (WIS) performance under heterogeneous time-varying conditions. The disclosed system uses a parallel processing architecture, and utilises timing controls that balance efficiency and performance, and minimize scheduling conflicts. The disclosed system can operate under conditions of infinite divisibility of data, and a variant version of the disclosed system can operate under the more practical conditions of finite data granularity. The disclosed system operates at the physical layer of the OSI model.

In accordance with one aspect of the invention, there is provided a method of transmitting data over a plurality of wireless frequency bands between a transmitter and a receiver during one of a plurality of rounds, the method comprising: computing a target spacing in time between a start time of transmission in a first band and a start time of transmission in a second band dependent on a first data rate in the one round and in the first band; commencing transmitting, by the transmitter, a first frame of data over the first band at the first data rate; waiting for the computed target spacing to elapse, and then commencing transmitting, by the transmitter, a second frame of data over the second band at a second data rate.

In accordance with a second aspect of the invention, there is provided a transmitter comprising: a processor configured, to compute a target spacing in time between a start time of transmission in a first band and a start time of transmission in a second band dependent on a first data rate in the first band; and a switch configured to: commence transmitting a first frame of data from a first buffer over the first band at the first data rate; wait for the computed target spacing to elapse, and then commence transmitting a second frame of data from a second buffer over the second band at a second data rate.

In accordance with a third aspect of the invention, there is provided computer program code configured to cause a computing device to perform a method according to the first aspect.

BRIEF DESCRIPTION OF DRAWINGS

At least one embodiment of the present invention will now be described with reference to the drawings, in which.

DESCRIPTION OF EMBODIMENTS

Figure 1:
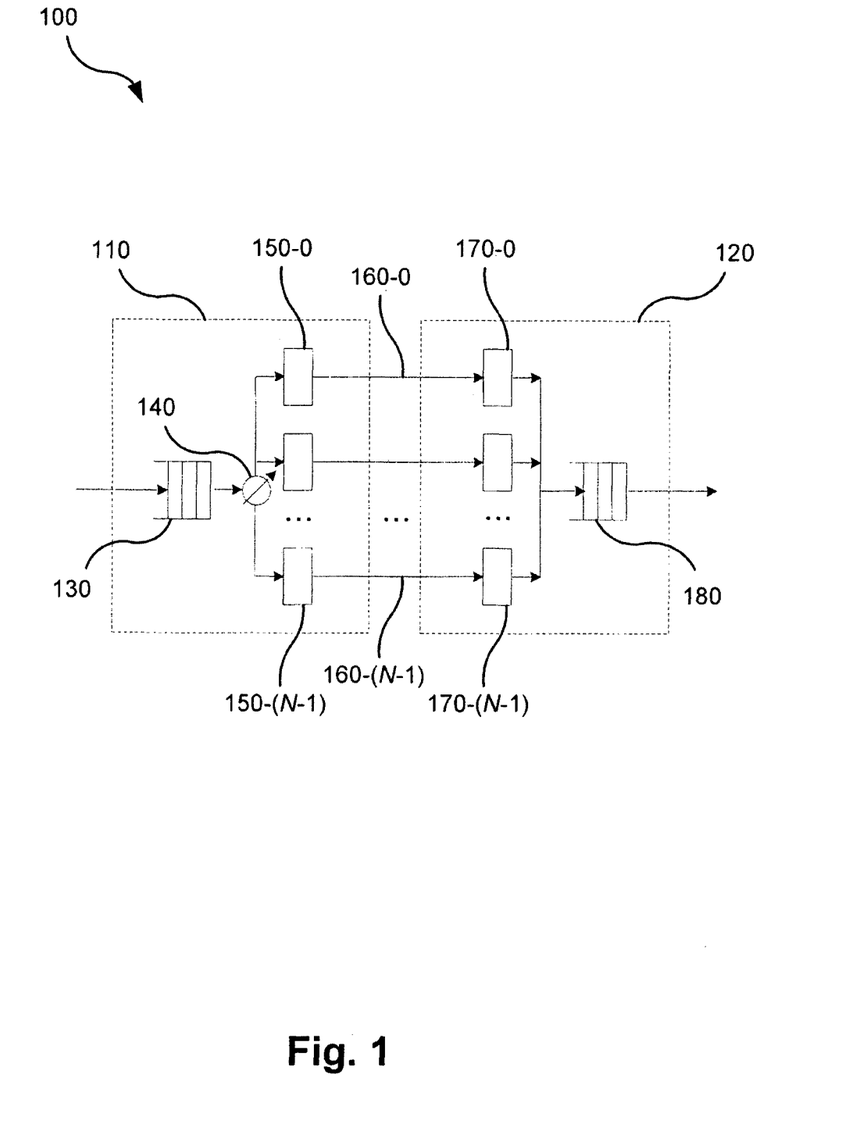
FIG. 1 is a block diagram of a multi-band wireless backhaul system according to one embodiment.

FIG. 1 is a block diagram of a multi-band wireless backhaul system 100 according to one embodiment. The system 100 uses N disjoint frequency bands of, in general, different band data rates. The data rate of each band may be different from that of other bands due to different available spectrum bandwidth for the band. The N bands are used to implement N wireless data transmission channels 160-0, . . . , 160-(N−1) that are "striped" to form a wireless link between the transmitter 110 and the receiver 120. Adaptive Modulation and Coding (AMC) is employed on each channel 160-*i* (i=0, . . . , N−1) with modulation level ranging from QPSK to 256-QAM, depending on the quality of the corresponding band.

Time is divided into intervals referred to as "rounds", indexed by j>0. The band data rates not only vary between channels i, but also vary between rounds j depending on the modulation level used in a round as determined by the AMC scheme in use.

The system 100 is illustrated as uni-directional; however the same components as illustrated in FIG. 1 and the corresponding processes, described below, may be used to implement a "striped" link in the reverse direction, that is from the receiver 120 to the transmitter 110.

Incoming data is first stored in an input buffer 130 in the transmitter 110. A striping scheduler 140 arbitrates the data loading from the input buffer 130 to the band transmitters 150-*i* using a scheduling process described in detail below. The data are transmitted from the band transmitters 150-*i* through the respective channels 160-*i* to respective band receivers 170-*i* at the receiver 120. As the scheduling process guarantees in-sequence delivery, there is no need for a complicated receive scheduler or reorder buffer at the receiver 120. The receiver 120 simply unloads the data from the band receivers 170-*i* to an output buffer 180 on a first-come-first-served (FCFS) basis, thereby combining the traffic into a single output stream from the output buffer 180.

Table 1 shows the meaning of the notation that is used throughout the present disclosure. The meanings in Table 1 will be further elaborated below.

TABLE 1

| Notation | |
| --- | --- |
| Notation | Meaning |
| N | Total number of bands (or channels) |
| i | band (channel) number, i ∈ [0, N − 1] |
| j | round number, j ∈ (0, ∞) |
| $f_{i,j}$ | Data frame in band i round j |
| $F_{i,j}$ | Size of data frame $f_{i,j}$ |
| $L_{i,j}$ | Loading time of data frame $f_{i,j}$ |
| $s_{i,j}$ | Time slot in band i round j |
| $T_{i,j}$ | Start time of time slot $s_{i,j}$ |

TABLE 1-continued

| Notation | |
| --- | --- |
| Notation | Meaning |
| $S_{i,j}$ | Length of time slot $s_{i,j}$ |
| $\sigma_{i,j}$ | propagation delay of band i in round j |
| $U_{i,j}$ | Unloading time of data frame $f_{i,j}$ |
| $E_{i,j}$ | Exit time of data frame $f_{i,j}$ |
| $R_{i,j}$ | Transmission rate (or data rate) of band i in round j |
| $\tau_{i,j}$ | Striping delay of band i in round j |
| $R_L$ | Loading rate |
| $R_U$ | Unloading rate |
| $S_c$ | Target constant time slot length or round time |
| $P_i$ | Target spacing of transmit times between band i and band i-1 |
| $D_{i,j}$ | Target delay of band i in round j |

Figure 2A:
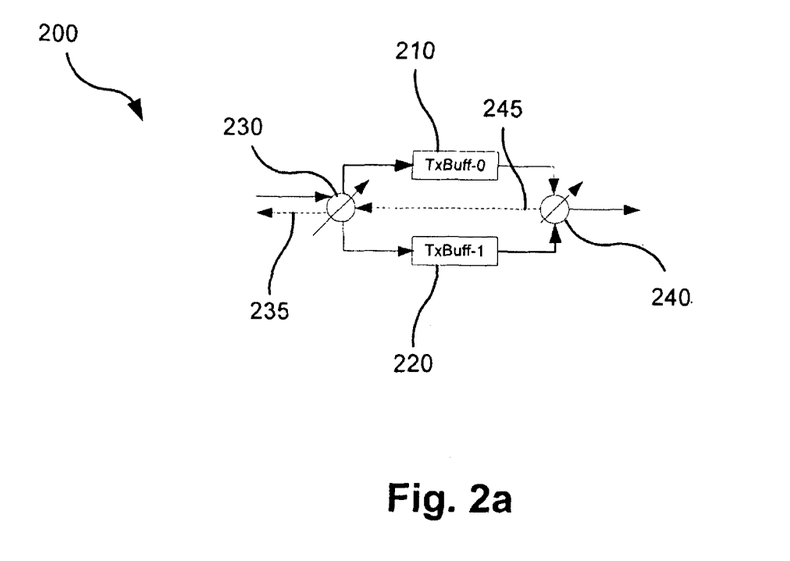
FIGS. 2a and 2b are block diagrams of circuits that may be used to implement the band transmitters and the band receivers respectively in the system of FIG. 1.

FIGS. 2*a* and 2*b* are block diagrams of circuits 200 and 250 that may be used to implement the band transmitters 150-*i* and the band receivers 170-*i* respectively in the system 100 of FIG. 1 according to one embodiment. The circuit 200 of FIG. 2*a* has a dual buffer parallel processing architecture containing two buffers 210 and 220, labelled as TxBuff-0 and TxBuff-1. A switch (multiplexer) 240 is configured to transmit the contents of the first buffer TxBuff-0 210, denoted as data frame $f_{i,j}$, via the channel 160-*i* at the transmission rate $R_{i,j}$, commencing at time $T_{i,j}$ during round j. Also commencing at time $T_{i,j}$, a switch (demultiplexer) 230 is configured to load a portion of incoming data, data frame $f_{i,j+1}$, at the loading rate $R_L$ into the second buffer TxBuff-1 220, taking $L_{i,j+1}$ seconds. Once transmission of the data frame $f_{i,j}$ is complete, the multiplexer 240 returns a "ready" signal 245 to the demultiplexer 230. During the following round j+1, the multiplexer 240 is configured to transmit the contents of the second buffer TxBuff-1 220 (data frame $f_{i,j+1}$) via the channel 160-*i* at the transmission rate $R_{i,j+1}$, while the demultiplexer 230 is configured to load a further portion of incoming data, data frame $f_{i,j+2}$, at the loading rate $R_L$ into the first buffer TxBuff-0 210, taking $L_{i,j+2}$ seconds. The demultiplexer 230 is also configured to relay the ready signal 245 back to its input stage (the striping scheduler 140) via a control line 235 to inform the striping scheduler 140 that the circuit 200 is ready to load the next data frame.

Figure 2B:
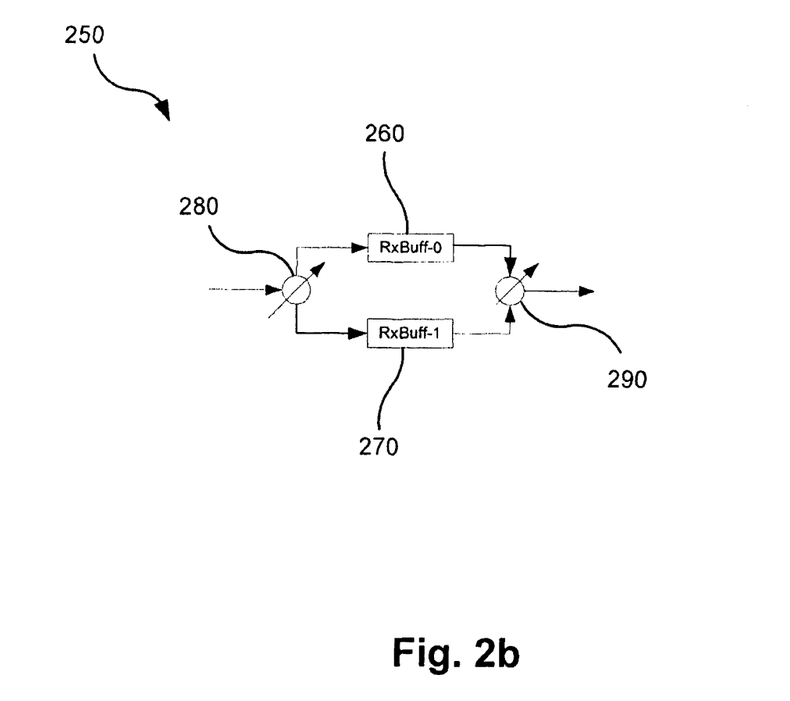

Similarly, the circuit 250 of FIG. 2*b* has a dual buffer parallel processing architecture containing two buffers 260 and 270, labelled as RxBuff-0 and RxBuff-1. A switch (demultiplexer) 280 is configured to receive the data frame $f_{i,j}$ into the first buffer RxBuff-0 260 via the channel 160-*i* at the transmission rate $R_{i,j}$ during round j. Commencing at the same instant, a switch (multiplexer) 290 is configured to unload the data frame $f_{i,j-1}$, to its output stage (the output buffer 180) at the unloading rate $R_U$ from the second buffer RxBuff-1 270, taking $U_{i,j-1}$ seconds and ending at time $E_{i,j-1}$. During the following round j+1, the demultiplexer 280 is configured to receive the data frame $f_{i,j+1}$ into the second buffer RxBuff-1 270 via the channel 160-*i* at the transmission rate $R_{i,j+1}$, while the multiplexer 290 is configured to unload the data frame $f_{i,j}$ to its output stage at the unloading rate $R_U$ from the first buffer RxBuff-1 260, taking $U_{i,j}$ seconds and ending at time $E_{i,j}$.

The striping delay $\tau_{i,j}$ is defined as the delay between when a frame $f_{i,j}$ starts being loaded into the band i band transmitter 150-*i* at the transmitter 110 and when the frame $f_{i,j}$ finishes being unloaded out of the band i band receiver 170-*i* at the receiver 120 (in other words the difference between $E_{i,j}$ and $T_{i,j-1}$).

The band transmitters 150-$i$ and band receivers 170-$i$ require high speed processing. In one implementation, the buffers 210, 220, 260, and 270 are implemented in block RAM, which is a limited resource in FPGA hardware. The input buffer 130 requires a much larger capacity to store backlogged data, and in one implementation is implemented in more abundant, though slower, flash memory.

As mentioned above, the scheduling process loads the data frame $f_{i,j}$, of size $F_{i,j}$, from the input buffer 130 to the band transmitter 150-$i$. The size $F_{i,j}$ of the frame $f_{i,j}$ is determined as part of the scheduling process, described in detail below.

The loading of the data frame $f_{i,j}$ to the band transmitter 150-$i$ is carried out as a memory access operation within the transmitter 110. The loading rate $R_L$ is constant across all band transmitters 150-$i$. The loading time $L_{i,j}$ of data frame $f_{i,j}$ satisfies $$L_{i,j} = \frac{F_{i,j}}{R_L} \quad (1)$$

The transmission of frame $f_{i,j}$ occupies time slot $s_{i,j}$, of length $S_{i,j}$ seconds. As mentioned above, within band $i$, the transmission rate $R_{i,j}$ stays constant within a time slot $s_{i,j}$, but may vary between rounds $j$ depending on the AMC level.

The time slot length $S_{i,j}$ satisfies $$S_{i,j} = \frac{F_{i,j}}{R_{i,j}} \quad (2)$$

As the N bands implement parallel point-to-point channels 160-$i$, their propagation delays, $\sigma_{i,j}$, are bounded with insignificant variations compared to the slot length $S_{i,j}$. The propagation delays in all the channels $i$ over all rounds $j$ are therefore treated as equal, i.e. $\sigma_{i,j} \equiv \sigma$.

At the receiver 120, the received data frame $f_{i,j}$ is unloaded from the corresponding band receiver 170-$i$ to the output buffer 180 at an unloading rate of $R_U$. The unloading is carried out as a memory access operation within the receiver 120. The unloading rate $R_U$ is therefore constant across all band receivers 170-$i$. The unloading time $U_{i,j}$ satisfies $$U_{i,j} = \frac{F_{i,j}}{R_U} \quad (3)$$

The band transmitter 150-$i$ controls the timing of the transmit operation in each band $i$. More precisely, the band transmitter 150-$i$, according to the scheduling process described below, computes a time $T_{i,j}$ at which to start transmitting the data frame $f_{i,j}$ over the channel 160-$i$, and to start loading the data frame $f_{i,j+1}$ from the input buffer 130.

$P_i$ denotes the target spacing in time between the start of the transmit time on band $i$ and the start of the transmit time on the preceding band $i-1$, i.e.

$$P_i = T_{i,j} - T_{i-1,j}, 0 < i \leq N-1$$

$$P_0 = T_{0,j} - T_{N-1,j-1} \quad (4)$$

The band transmitter 150-$i$ computes the times $T_{i,j}$ by first computing the target spacing $P_i$ in the manner described below. Note that the target spacings $P_i$ are independent of the round $j$.

Figure 3:
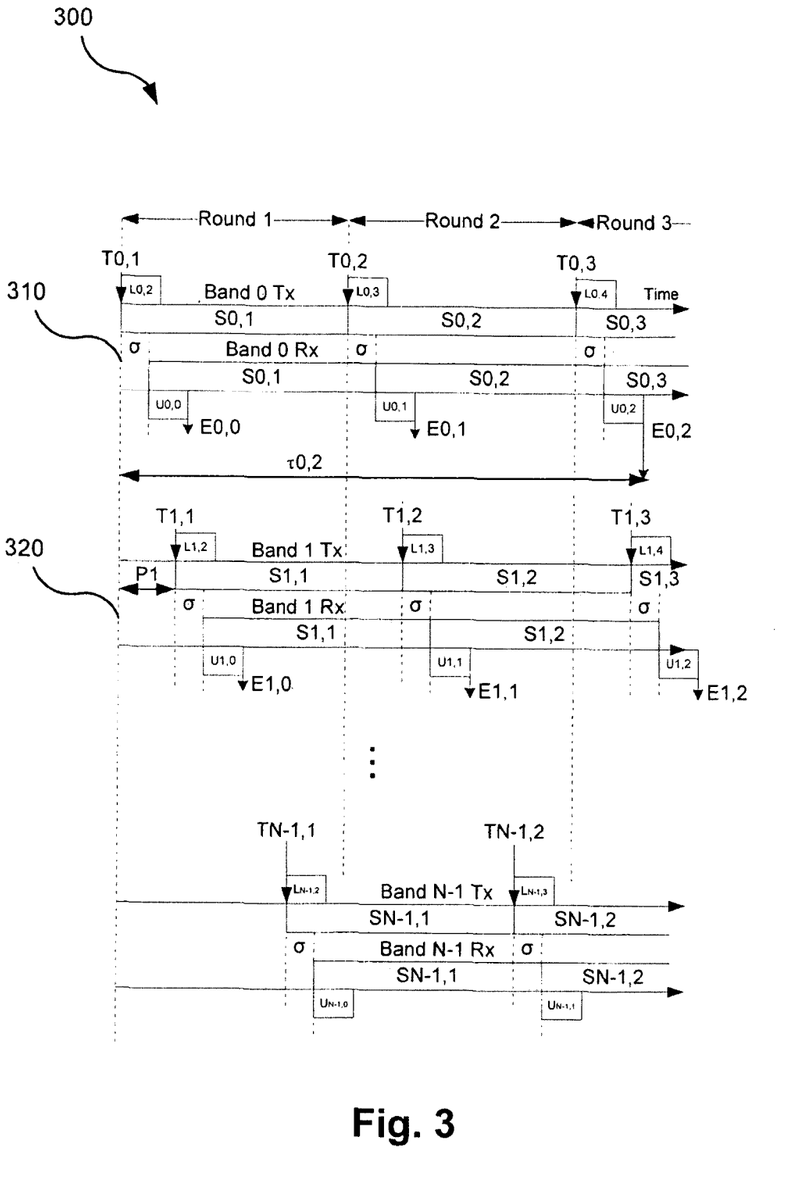
FIG. 3 is a timing diagram illustrating an exemplary timing of loading, transmitting, and unloading over different bands and rounds within the system of FIG. 1.

FIG. 3 is a timing diagram illustrating an exemplary timing 300 of loading, transmitting, receiving, and unloading over different bands $i$ and rounds $j$ in the system 100 of FIG. 1. Each row represents one of the N bands, indexed from top to bottom by 0 to N−1. Band 0, represented by the first row 310, is defined to be the reference band, and its time slots $s_{0,j}$ define the rounds $j$, where $j$ increases from left to right. The start of each round $j$ is therefore at time $T_{0,j}$.

In the first round ($j$=1) of the first row 310, data frame $f_{0,2}$ is loaded, taking $L_{0,2}$ seconds, into the band transmitter 150-0, where it is stored while the band transmitter 150-0 transmits data frame $f_{0,1}$ in time slot $s_{0,1}$, taking $S_{0,1}$ seconds. After a propagation delay of $\sigma$ seconds, the data frame $f_{0,1}$ starts to be received by the band receiver 170-0, taking $S_{0,1}$ seconds. Meanwhile, the previously received data frame $f_{0,0}$ is unloaded from the band receiver 170-0 to the output buffer 180 in $U_{0,0}$ seconds, ending at time $E_{0,0}$.

At time $T_{0,2}$, the start of the second round ($j$=2), the band transmitter 150-0 starts transmitting data frame $f_{0,2}$ in time slot $s_{0,2}$, taking $S_{0,2}$ seconds, and loading data frame $f_{0,3}$, taking $L_{0,3}$ seconds. After a propagation delay of $\sigma$ seconds, the data frame $f_{0,2}$ starts to be received by the band receiver 170-0, taking $S_{0,2}$ seconds. Meanwhile, the received data frame $f_{0,1}$ is unloaded from the band receiver 170-0 to the output buffer 180 in $U_{0,1}$ seconds, ending at time $E_{0,1}$.

In the second row 320 corresponding to band $i$=1, the same operations take place, except delayed within each round $j$ by the time $T_{1,j}$. Likewise, operations in all subsequent bands (up to $i$=N−1) are delayed within each round $j$ relative to band 0 by the time $T_{i,j}$.

To achieve work-conserving, the band transmitter 150-$i$ computes a constant slot length $S_c$ in accordance with the constraints described in detail below, and controls the data frame sizes $F_{i,j}$ such that the lengths $S_{i,j}$ of all time slots $s_{i,j}$ across all bands $i$ and rounds $j$ are made equal to $S_c$:

$$F_{i,j} = S_c \cdot R_{i,j} \quad (5)$$

The data in the input buffer 130 is first assumed to be infinitely divisible, i.e. $F_{i,j}$ can be controlled to any length. Using divisible load theory (DLT), fundamental constraints, timing controls, and hence the scheduling process described below, may be derived. A variant of the scheduling process, also described below, may also be derived based on the practical case of finite divisibility, or granularity, of the data in the input buffer 130.

Across different bands $i$, within a given round $j$, the starts $T_{i,j}$ of the time slots $s_{i,j}$ are scheduled in ascending order of band number $i$:

$$T_{0,j} \leq T_{i,j} < T_{i+1,j} < T_{0,j+1}, \forall i,j. \quad (6)$$

This condition is equivalent to requiring positive target spacings $P_i$.

An unintelligent scheduling process would space the starts $T_{i,j}$ of the time slots $s_{i,j}$ across all the bands. However, such an unintelligent schedule would not guarantee in-sequence delivery for heterogeneous systems.

The necessary conditions for the system 100 of FIG. 1 to achieve work-conserving in-sequence striping (WIS) are now described. At the transmitter 110 and receiver 120, the loading rate $R_L$ and the unloading rate $R_U$ are required to satisfy the following conditions.

$$R_L \geq \max_{j \in (0, \infty)} \left\{ \sum_{i=0}^{N-1} R_{i,j} \right\} \quad (7)$$

$$R_U \geq \max_{j \in (0,\infty)} \left\{ \sum_{i=0}^{N-1} R_{i,j} \right\} \quad (8)$$

That is, the loading and unloading rates $R_L$ and $R_U$ must both be greater than or equal to the maximum over all rounds of the sum of the transmission rates $R_{i,j}$ within each round over all bands. Equations (7) and (8) govern the choice of hardware used to implement the buffers 210, 220, 260, and 270 in the circuits 200 and 250 respectively.

The next design parameter is the constant slot length $S_c$. It may be shown that the striping delay $\tau_{i,j}$ is approximately proportional to the constant slot length $S_c$. There is thus an incentive to minimize the constant slot length $S_c$. It may also be shown that the lower bound on the constant slot length $S_c$ is given by $$S_c \geq \frac{\max_{j \in (0,\infty)} \left\{ \sum_{i=0}^{N-1} F_{i,j} \right\}}{\min\{R_L, R_U\}} \quad (9)$$

That is, the constant slot length $S_c$ must be at least the ratio of the maximum over all rounds of the sum over all bands of the frame sizes $F_{i,j}$ to the minimum of the loading rate $R_L$ and the unloading rate $R_U$. The upper bound of the constant slot length $S_c$ is determined by the resources of the system 100 by taking the maximum possible size of each band transmitter or band receiver 150-$i$ and 170-$i$ and dividing by the maximum transmission rate $R_{i,j}$. The final choice of the constant slot length $S_c$, balancing system performance, efficiency, and resource requirements, is between these lower and upper bounds.

In one exemplary implementation, the transmitter and 110 receiver 120 operate to a system clock of 156.25 MHz and an internal data width of 64 bits. This gives the loading and unloading rates of $R_L = R_U = 10$ Gbps. The transmit buffers 210 and 220 in each band i are each implemented in the block RAM of an FPGA with capacity of 15 Mbits. Half of the 15 Mbits of block RAM (i.e. 7.5 MBits) is allocated for the two transmit buffers 210 and 220 on each of the N bands, so each buffer 210 or 220 has at most 7.5/(2N) Mbits capacity. For N=3 bands, the maximum capacity for each transmit buffer is therefore 1.25 Mbits. The receive buffers 260 or 270 are implemented in the same way. Under a maximum transmission rate $R_{i,j}$ of 3.77 Gbps, and a frame size of 1.25 Mbits, the upper bound on the constant slot length $S_c$ is 331 μs. In order to achieve a reasonable level of system efficiency, the minimum frame size $F_{i,j}$ is set to 500 kbits. Using equation (9), this gives a lower bound of $S_c$ of 150 μs. The constant slot length $S_c$ is therefore set to 200 μs, between the upper and lower bounds.

The band transmitter 150-$i$ also needs to compute the times $T_{i,j}$ at which to start transmitting data frames $f_{i,j}$ over the channels 160-$i$, and to start loading the data frames $f_{i,j+1}$ from the input buffer 130, subject to equation (6). To do this, the band transmitter 150-$i$ computes the target spacing $P_i$ between transmit times in band i and transmit times in its preceding band i−1 dependent on the transmission rate $R_{i-1,j}$ in the preceding band i−1, such that:

each band transmitter 150-$i$ has enough time to finish loading its frame before the next band transmitter 150-($i$+1) starts its loading process, and each band receiver 170-$i$ has enough time to finish loading its frame before the next band receiver 170-($i$+1) starts its unloading process.

The loading and unloading processes in all the bands can, in this implementation, be executed consecutively without overlapping, thereby realizing in-sequence striping.

In one implementation, the target spacing $P_i$ between the transmit times in band i and the preceding band i−1 is set to the maximum transmission rate in band i−1 over all rounds, divided by the sum over all bands of the maximum transmission rate within each band over all rounds, multiplied by the constant slot length $S_c$:

$$P_i = \frac{\max_{j \in (0,\infty)} R_{i-1,j}}{\sum_{i=0}^{N-1} \left\{ \max_{j \in (0,\infty)} R_{i,j} \right\}} S_c, \quad 0 < i \leq N-1 \quad (10)$$

$$P_0 = \frac{\max_{j \in (0,\infty)} R_{N-1,j}}{\sum_{i=0}^{N-1} \left\{ \max_{j \in (0,\infty)} R_{i,j} \right\}} S_c$$

In the case where transmission rates are constant over all rounds j, the spacing in a band as a proportion of the constant slot length $S_c$ is the same as the transmission rate in the preceding band as a proportion of the sum of the transmission rates over all bands.

Figure 4:
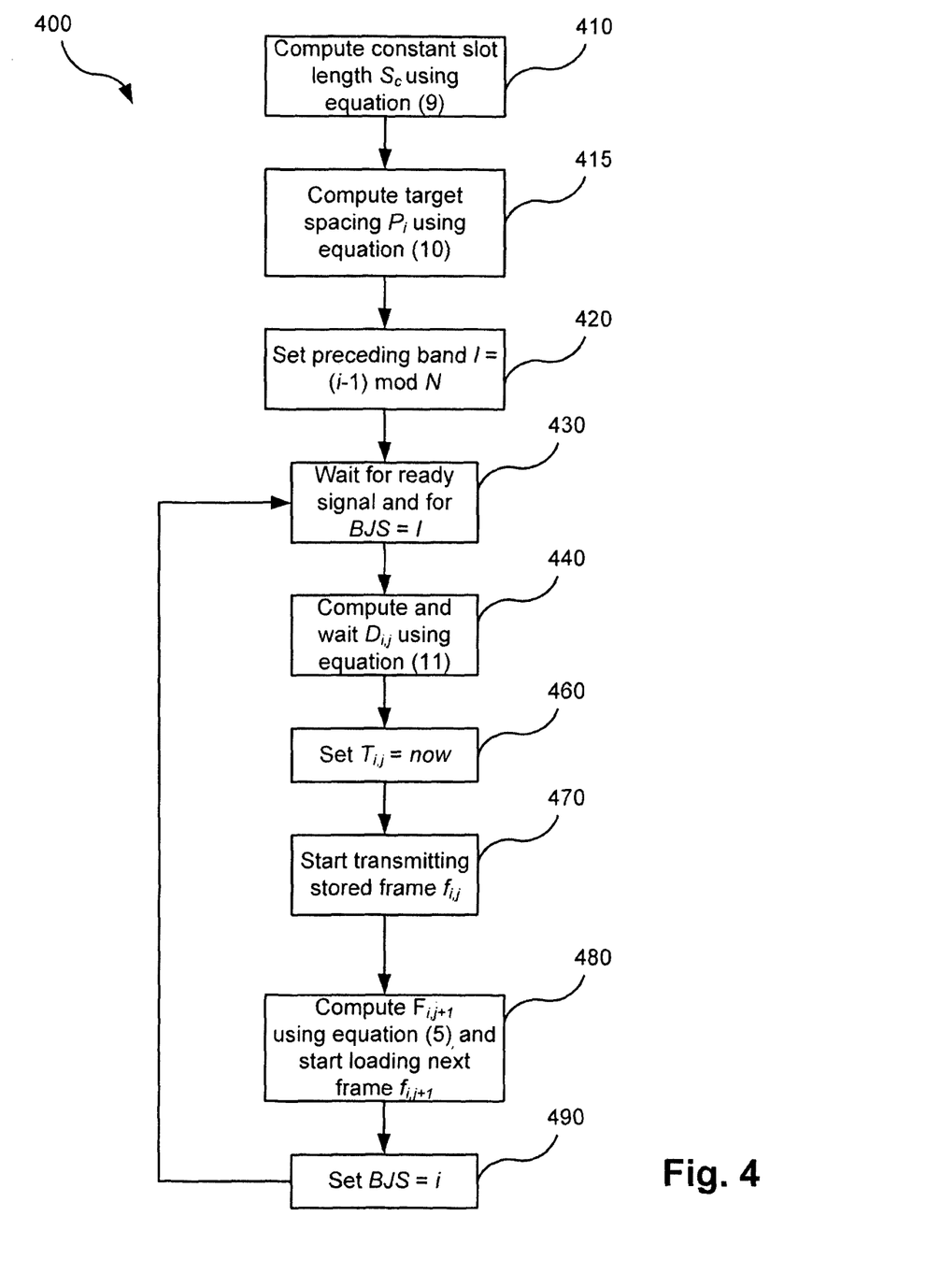
FIG. 4 contains a flow chart illustrating a scheduling process carried out by each band transmitter in the system of FIG. 1 according to one embodiment.

FIG. 4 contains a flow chart illustrating a scheduling process 400 carried out by each band transmitter 150-$i$ (i=0, N−1) in the system 100 of FIG. 1 according to one embodiment.

Figure 5:
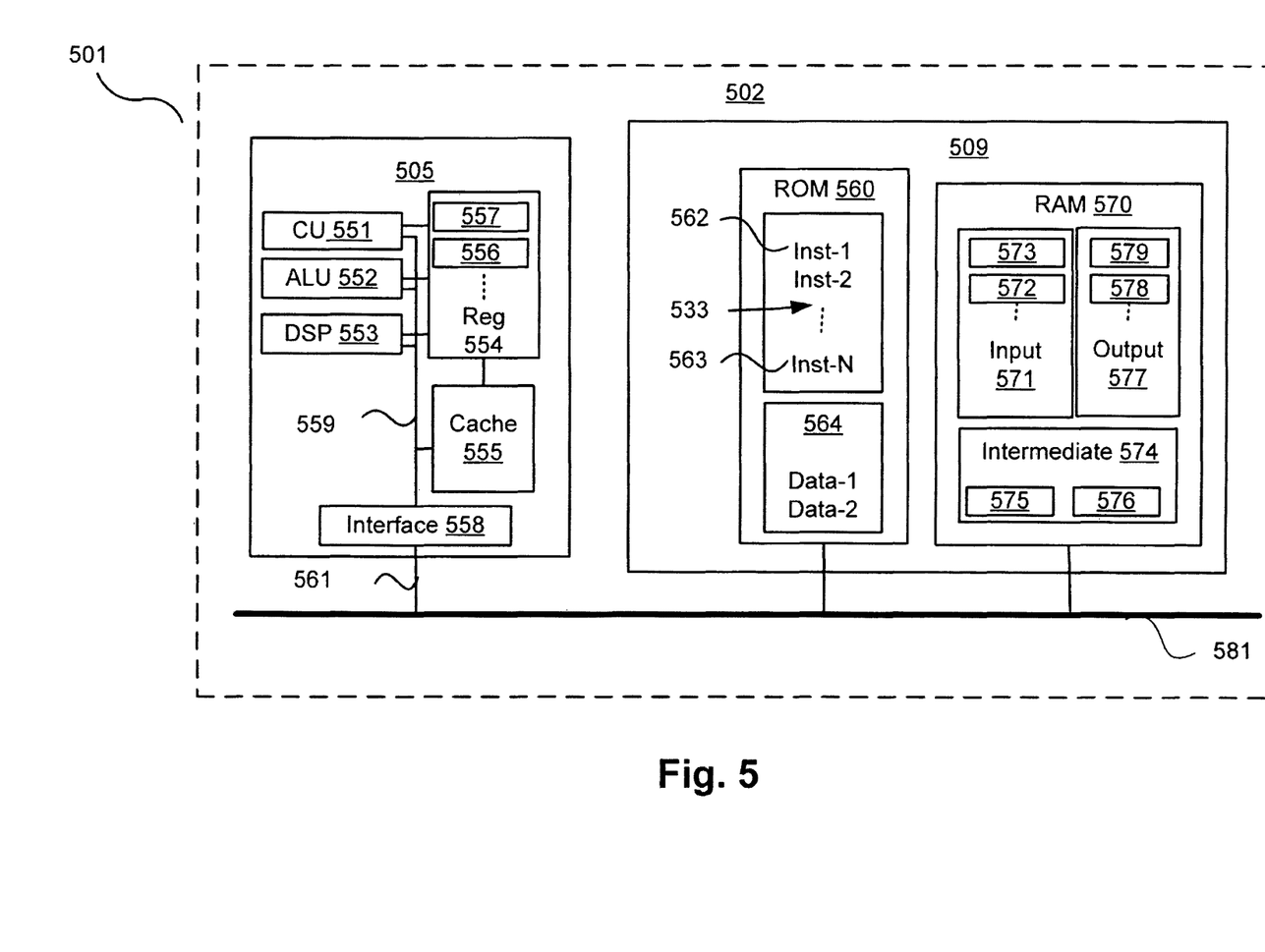
FIG. 5 is a schematic block diagram representation of a computing device as which the band transmitters and the band receivers in the system of FIG. 1 may be implemented.

FIG. 5 is a schematic block diagram of a general purpose computing device 501 including embedded components, as which the band transmitters 150-$i$ and the band receivers 170-$i$ in the system 100 of FIG. 1 may be implemented.

As seen in FIG. 5, the computing device 501 comprises an embedded controller 502. Accordingly, the computing device 501 may be referred to as an "embedded device." In the present example, the controller 502 has a processing unit (or processor) 505 which is bi-directionally coupled to an internal storage module 509. The storage module 509 may be formed from non-volatile semiconductor read only memory (ROM) 560 and semiconductor random access memory (RAM) 570, as seen in FIG. 5. The RAM 570 may be volatile, non-volatile or a combination of volatile and non-volatile memory. When the computing device 501 is implementing the band transmitters 150-$i$ and the band receivers 170-$i$, the buffers 210, 220, 260, and 270 are implemented within the RAM 570, while the switches 230, 240, 280, and 290 are emulated by the processor 505.

The scheduling processes described hereinafter may be implemented using the embedded controller 502, as one or more software programs 533 executable within the embedded controller 502. In particular, with reference to FIG. 5, the steps of the described processes are effected by instructions in the software 533 that are carried out within the embedded controller 502. The software instructions may be formed as one or more code modules, each for performing one or more particular tasks.

The software 533 of the embedded controller 502 is typically stored in the non-volatile ROM 560 of the internal storage module 509. The software 533 stored in the ROM 560 can be updated when required from a computer readable medium. The software 533 can be loaded into and executed by the processor 505. In some instances, the processor 505 may execute software instructions that are located in RAM 570. Software instructions may be loaded into the RAM 570 by the processor 505 initiating a copy of one or more code modules from ROM 560 into RAM 570. Alternatively, the software instructions of one or more code modules may be pre-installed in a non-volatile region of RAM 570 by a manufacturer. After one or more code modules have been located in RAM 570, the processor 505 may execute software instructions of the one or more code modules.

The program 533 is typically pre-installed and stored in the ROM 560 by a manufacturer, prior to distribution of the computing device 501. The use of such a program 533 in the computing device 501 effects an apparatus for scheduling transmissions in the transmitter 110 of FIG. 1.

The internal storage 509 comprises read only memory (ROM) 560 and random access memory (RAM) 570. The processor 505 is able to execute the programs 533 stored in one or both of the connected memories 560 and 570. When the computing device 501 is initially powered up, a system program resident in the ROM 560 is executed. The program 533 permanently stored in the ROM 560 is sometimes referred to as "firmware". Execution of the firmware by the processor 505 may fulfil various functions, including processor management, memory management, device management, storage management and user interface.

The processor 505 typically includes a number of functional modules including a control unit (CU) 551, an arithmetic logic unit (ALU) 552 and a local or internal memory comprising a set of registers 554 which typically contain atomic data elements 556, 557, along with internal buffer or cache memory 555. One or more internal buses 559 interconnect these functional modules. The processor 505 typically also has one or more interfaces 558 for communicating with external devices via system bus 581, using a connection 561.

The program 533 includes a sequence of instructions 562 through 563 that may include conditional branch and loop instructions. The program 533 may also include data, which is used in execution of the program 533. This data may be stored as part of the instruction or in a separate location 564 within the ROM 560 or RAM 570.

In general, the processor 505 is given a set of instructions, which are executed therein. This set of instructions may be organised into blocks, which perform specific tasks or handle specific events that occur in the computing device 501. Typically, the program. 533 waits for events and subsequently executes the block of code associated with that event. Events may be triggered in response to other sensors and interfaces in the computing device 501.

The execution of a set of the instructions may require numeric variables to be read and modified. Such numeric variables are stored in the RAM 570. The disclosed method uses input variables 571 that are stored in known locations 572, 573 in the memory 570. The input variables 571 are processed to produce output variables 577 that are stored in known locations 578, 579 in the memory 570. Intermediate variables 574 may be stored in additional memory locations in locations 575, 576 of the memory 570. Alternatively, some intermediate variables may only exist in the registers 554 of the processor 505.

The execution of a sequence of instructions is achieved in the processor 505 by repeated application of a fetch-execute cycle. The control unit 551 of the processor 505 maintains a register called the program counter, which contains the address in ROM 560 or RAM 570 of the next instruction to be executed. At the start of the fetch execute cycle, the contents of the memory address indexed by the program counter is loaded into the control unit 551. The instruction thus loaded controls the subsequent operation of the processor 505, causing for example, data to be loaded from ROM memory 560 into processor registers 554, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes described below is associated with one or more segments of the program 533, and is performed by repeated execution of a fetch-execute cycle in the processor 505 or similar programmatic operation of other independent processor blocks in the computing device 501.

The scheduling processes may alternatively be implemented in dedicated hardware such as one or more integrated circuits performing the functions or sub-functions of the scheduling processes. Such dedicated hardware may include graphic processors, digital signal processors, field programmable gate arrays (FPGAs), or one or more microprocessors and associated memories.

The scheduling process 400 illustrated in FIG. 4 will now be described. In the implementation in which the band i band transmitter 150-$i$ is implemented as the computing device 501, the steps of the scheduling process 400 are carried out by the processor 505 controlled by the software 533.

The scheduling process 400 starts at step 410, at which the band transmitter 150-$i$ computes the constant slot length $S_c$ between the lower bound given in equation (9) and the upper bound set by the resources of the system 100, as described above. Step 415 follows, at which the band transmitter 150-$i$ computes the target spacing $P_i$ using equation (10). At the next step 420, the band transmitter 150-$i$ sets the preceding band index l to (i−1) mod N, which is equal to i−1 except when i=0, when l is N−1. The scheduling process 400 then enters a loop in which the round number j increments from 1 at each iteration.

At the first step 430 in the loop, the band transmitter 150-$i$ waits for a global variable BJS (for "band just started") to be equal to the index l of the preceding band, and for the "ready" signal 245 to arrive from the multiplexer 240. The band transmitter 150-$i$ is then ready to transmit its stored frame $f_{i,j}$. However, when the system 100 starts from idle, or is under unsaturated load, the current time, now, (provided by a clock within the band transmitter 150-$i$), may be early compared to the target start time of $T_{l,j}+P_i$. Therefore, the band transmitter 150-$i$ at step 440 computes a target delay of $D_{i,j}$ to maintain the spacing of $P_i$ from the start time $T_{l,j}$ of the transmit time of the preceding band l. The band transmitter 150-$i$ computes the target delay $D_{i,j}$ at step 440 as follows:

$$D_{0,j}=T_{l,j-1}+P_0-\text{now}$$

$$D_{i,j}=T_{l,j}+P_i-\text{now}, 0<i\le N-1 \qquad (11)$$

Also at step 440, the band transmitter 150-$i$ waits for the target delay $D_{i,j}$ to elapse. At the next step 460, the band transmitter 150-$i$ sets the start time $T_{i,j}$ to the current time now, and proceeds to, at step 470, start transmitting its stored frame $f_{i,j}$, and, simultaneously at step 480, compute the next frame size $F_{i,j+1}$ using equation (5), and start loading the next frame $f_{i,j+1}$. The simultaneous loading and transmitting by the band transmitter 150-$i$ is described above with reference to FIG. 2. As part of step 480, the band transmitter 150-$i$ relays the ready signal 245 back to the striping scheduler 140 via the control line 235 to inform the striping scheduler 140 that the band transmitter 150-$i$ is ready, to load the next data frame $f_{i,j+1}$.

Finally, at step 490, the band transmitter 150-$i$ sets the global variable BIS to i, and the scheduling process 400 then returns to step 430.

It may be shown that the scheduling process 400 guarantees work-conserving and in-sequence striping under conditions of infinite data divisibility. No re-ordering of received frames is therefore required at the band i band receiver 170-$i$, and, assuming sufficient data is always present in the input buffer 130, all transmission channels 160-$i$ are fully occupied at all times.

To demonstrate the work-conserving and in-sequence striping of the scheduling process 400, the system 100 has been implemented in a VHDL behavior model and simulated using ModelSim. The simulated system 100 operates with N=3 wireless channels 160-$i$, in the 6 GHz, 6.7 GHz, and 8 GHz frequency bands respectively. AMC with modulation level ranging from QPSK to 256QAM depending on the link quality was used. The maximum transmission rates are achieved with 256QAM under excellent channel conditions as $$\max_j R_{0,j} = 2794.5278 \text{ Mbps}$$

$$\max_j R_{1,j} = 3770.0208 \text{ Mbps}$$

$$\max_j R_{2,j} = 3193.7462 \text{ Mbps}$$

A system clock of 156.25 MHz and a data width of 64 bits gave loading and unloading rates of $R_L=R_U=10$ Gbps, which satisfy equations (7) and (8). The constant slot length is set at $S_c=200$ μs, based on the buffer capacities and frame sizes in the example implementation described above. The target spacings $P_i$ are determined by Equation (10) as $P_0=65.457$ μs, $P_1=57.275$ μs, and $P_2=77.268$ μs.

The average band utilization $\rho_i$ for band i is defined as $$\rho_i = \frac{1}{N_s} \sum_{j=1}^{N_s} \frac{\hat{R}_{i,j}}{R_{i,j}}$$

where $\hat{R}_{i,j}$ is the measured data rate on band i in round j, and $N_s$ is the number of measured sample frames. Under saturated load conditions, the average utilization for each band was measured over $N_s=100$ sample frames as $\rho_0=1.000098$, $\rho_1=0.9998630$, and $\rho_2=0.9998791$. All three bands are thus fully utilized within the error margin of the simulation, demonstrating the load sharing and work-conserving properties of the scheduling process 400.

Figure 7:
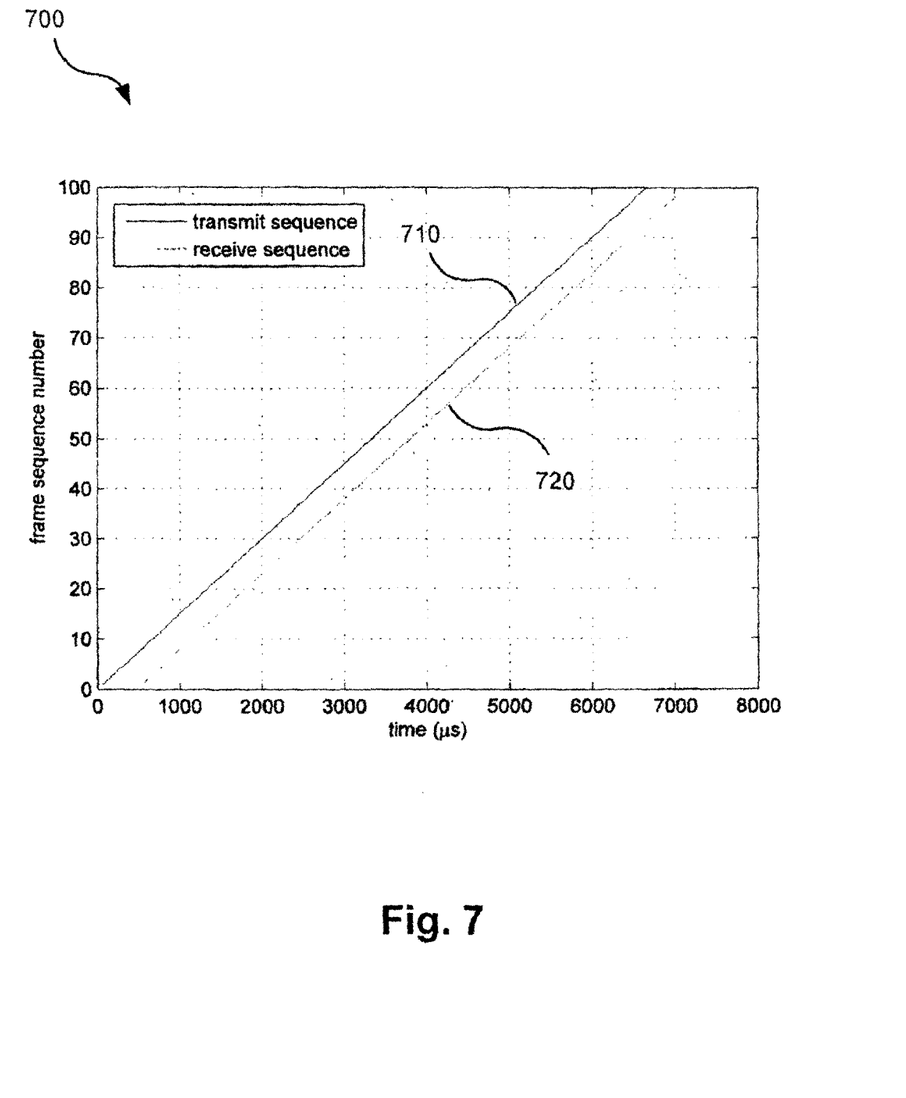
FIG. 7 contains a graph illustrating the transmit and receive sequence numbers of sample frames in a simulation of the system of FIG. 1.

To demonstrate the in-sequence property of the delivery sequence of the scheduling process 400, the transmit sequence number for each sample frame was recorded at the transmitter 110 of the simulated system 100 before the loading starts. The sequence numbers for the received frames were then recorded at the receiver 120 after the unloading finished. FIG. 7 contains a graph 700 illustrating the recorded transmit and receive sequence numbers. The upper trace 710 shows the transmit sequence numbers over time, and the lower trace 720 shows the received sequence numbers over time. FIG. 7 shows that that both transmit and receive sequence numbers increase monotonically with time. The frame sequence is therefore strictly maintained at both transmitter and receiver of the simulated system 100, thereby demonstrating the in-sequence striping property of the scheduling process 400.

Figure 8:
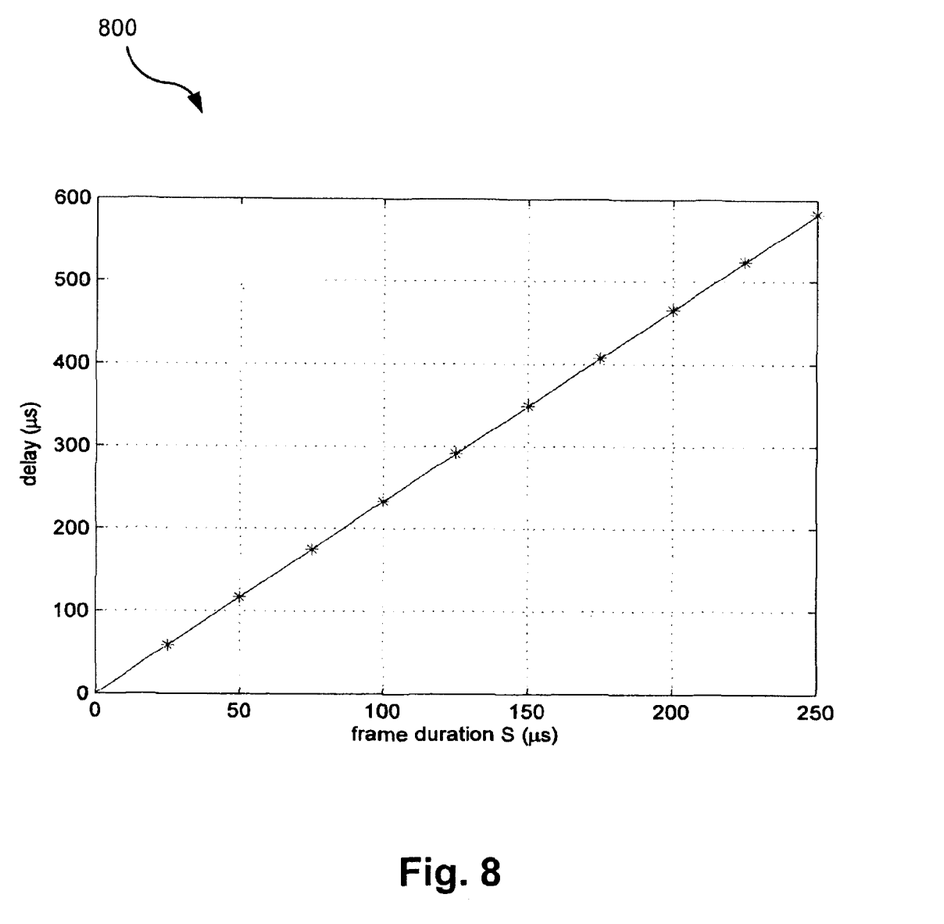
FIG. 8 contains a graph illustrating the striping delay in a simulation of the system of FIG. 1.

The performance of the simulated system 100 was evaluated in terms of striping delay $\tau_{i,j}$. To evaluate the relationship between striping delay $\tau_{i,j}$ and constant slot length $S_c$, the simulation was run for a range of constant slot lengths $S_c$ and the measured striping delay averaged over 100 sample frames for each constant slot length $S_c$. FIG. 8 contains a graph 800 illustrating the average striping delay plotted against constant slot length $S_c$. It can be seen from the graph 800 that the average striping delay is proportional to the constant slot length $S_c$, as expected. In addition, the average striping delay was shown to be independent of the number N of bands, in contrast with a reordering-based system, in which the average striping delay increases with the number N of bands.

A variant of the scheduling process 400 suitable for practical conditions of finite granularity of data in the input buffer 130 will now be described. Under these conditions, the data in the input buffer 130 is divisible to a non-zero (finite) frame size granularity $\Delta F$, which can be device word size, transmission cell size, or maximum transmission unit (MTU) size in a no-fragment transmission system. Such finite granularity may result in the target frame size defined in equation (5) not being strictly observed. Rather, the frame size $F_{i,j}$ satisfies $$F_{i,j} = S_c R_{i,j} + \delta F_{i,j} \tag{12}$$

where $0 \leq \delta F_{i,j} < \Delta F$. In order to achieve work-conserving in-sequence striping under such practical frame size granularity, the necessary conditions in equations (7) and (8) on load rate and unload rate respectively have become:

$$R_L \geq \max_{j \in (0,\infty)} \left\{ \sum_{i=0}^{N-1} R_{i,j} \right\} + \frac{N \Delta F}{S_c} \tag{13}$$

$$R_U \geq \max_{j \in (0,\infty)} \left\{ \frac{\sum_{i=0}^{N-1} R_{i,j} + \frac{N \Delta F}{S_c}}{1 - \frac{\Delta F}{S_c \cdot R_{0,j}}} \right\} \tag{14}$$

to accommodate the variations in frame size allowed by equation (12).

The increases in the lower bounds on the loading and unloading rates over those given in equations (7) and (8) are greater as the number of bands N and the frame size granularity $\Delta F$ increase. Equations (13) and (14) can be used to choose device hardware in a system with finite frame size granularity $\Delta F$ of word, cell, or packet sizes, such that scheduling conflicts can be avoided and work-conserving in-sequence striping can be achieved.

In the variant scheduling process, the band transmitter 150-$i$ controls the time slot length $S_{i,j}$ within a range with end points given by:

$$S_c - \Delta S_{i,j} \leq S_{i,j} \leq S_c + \Delta S_{i,j} \tag{15}$$

where $\Delta S_{t,j}$ is the "slot tolerance" given by $$\frac{\Delta F}{R_{i,j}}.$$

The band transmitter 150-i achieves this in band i and round j by first computing the target delay $D_{i,j}$ according to equation (11). If the target delay $D_{i,j}$ is greater than the slot tolerance $\Delta S_{i,j-1}$, it is likely that the input buffer 130 has run out of data. In this case the band transmitter 150-i sets a target frame size $F_{targ}$ for the next round j+1 using equation (5) and waits for the target delay $D_{i,j}$ to elapse. If, on the other hand, the target delay $D_{i,j}$ is less than the slot tolerance $\Delta S_{i,j-1}$, the target frame size $F_{targ}$ is set to $$F_{targ}=(S_c+D_{i,j})R_{i,j+1} \quad (16)$$

and transmission is commenced immediately, i.e. with no waiting. (The need for waiting has been removed by the adjustment to the frame size in accordance with equation (16)). Note that if the target delay $D_{i,j}$ is negative, which occurs if the preceding frame $f_{i,j-1}$ is longer than expected, the target frame size $F_{targ}$ is reduced from its "ideal" value in accordance with equation (16).

Figure 6:
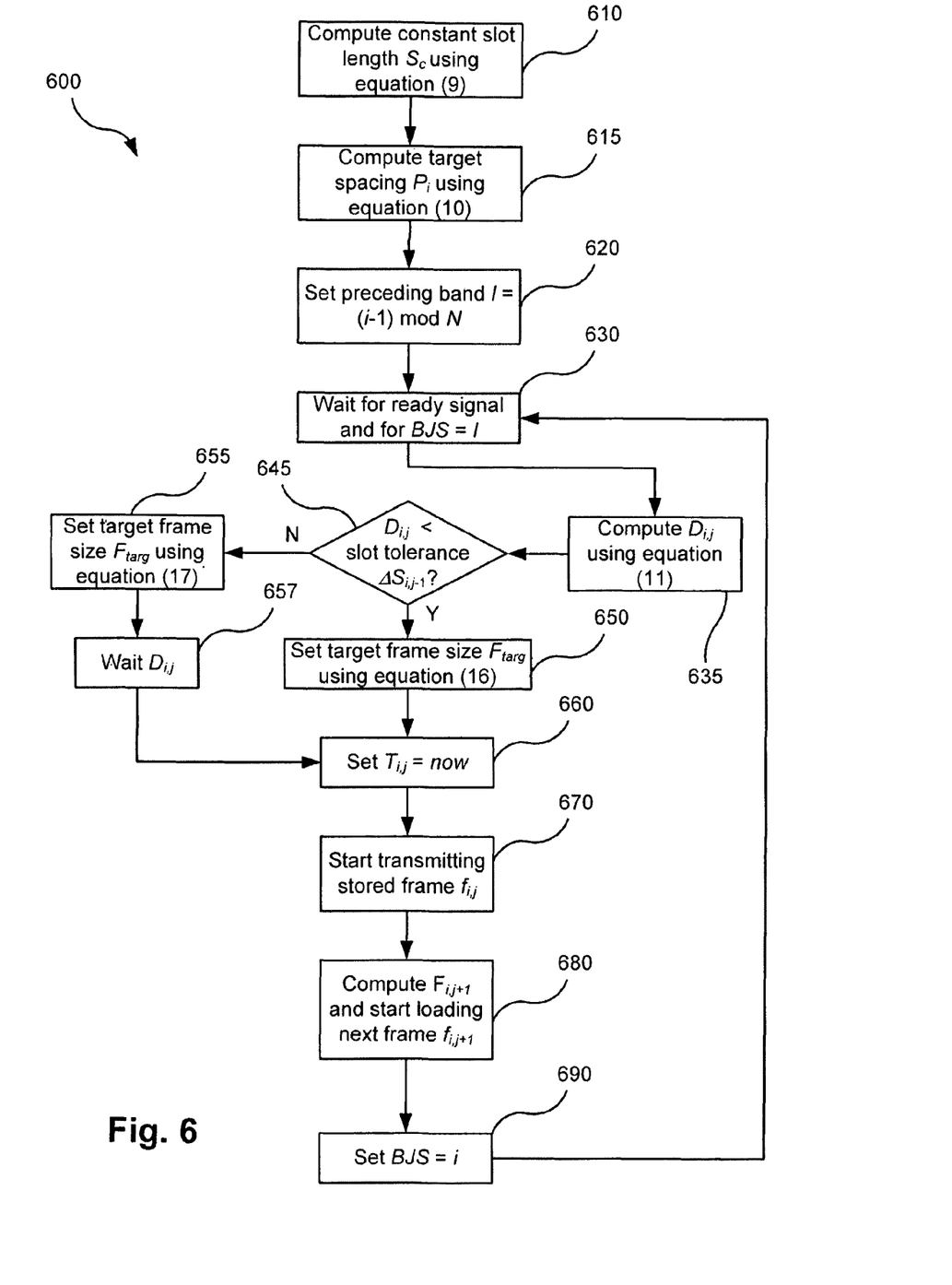
FIG. 6 contains a flow chart illustrating a variant scheduling process carried out by each band transmitter in the system of FIG. 1 according to one embodiment.

FIG. 6 contains a flow chart illustrating the variant scheduling process 600 carried out by each band transmitter 150-i in the system 100 of FIG. 1 according to one embodiment. In the implementation in which the band transmitter 150-i is implemented as the computing device 501, the steps of the scheduling process 600 are carried out by the processor 505 controlled by the software 533.

Except where otherwise indicated, the steps in the variant scheduling process 600 are the same as those with parallel numbering in the scheduling process 400 of FIG. 4, i.e. steps 610 to 630 and 660 to 690 are the same as the steps 410 to 430 and 460 to 490 respectively. The principal difference from the scheduling process 400 is that steps 635 to 657 are carried out in place of step 440.

At step 635, the band transmitter 150-i computes the target delay $D_{i,j}$ equation (11). At the next step 645, the band transmitter 150-i determines whether the target delay $D_{i,j}$ is less than the slot tolerance $\Delta S_{i,j-1}$. If so, the band transmitter 150-i, at step 650, sets the target frame size $F_{targ}$ using equation (16), and then proceeds to step 660.

If, however, the band transmitter 150-i determines that the target delay $D_{i,j}$ is greater than or equal to the slot tolerance $\Delta S_{i,j-1}$, the band transmitter 150-i, at step 655, sets the target frame size $F_{targ}$ as follows:

$$F_{targ}=S_c \cdot R_{i,j+1} \quad (17)$$

The band transmitter 150-i then at step 657 waits for the target delay $D_{i,j}$ to elapse before proceeding to step 660.

The other difference from the scheduling process 400 is that at step 680, the band transmitter 150-i computes the next frame size $F_{i,j+1}$ from the target frame size $F_{targ}$ computed at step 650 or step 655 by rounding the target frame size $F_{targ}$ to the nearest multiple of the frame size granularity $\Delta F$, and then commences loading the next frame $f_{i,j+1}$, of size $F_{i,j+1}$, from the input buffer 130.

It may be shown that the variant scheduling process 600 guarantees work-conserving and in-sequence striping under conditions of finite frame size granularity. No re-ordering of received frames is therefore required at the band i band receiver 170-i, and, assuming sufficient data is always present in the input buffer 130, all transmission channels 170-i are fully occupied at all times.

The arrangements described are applicable to the wireless communication industry.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of transmitting data over a plurality of wireless frequency bands between a transmitter and a receiver during one of a plurality of rounds, the method comprising:
   computing a target spacing in time between a start time of transmission in a first band and a start time of transmission in a second band dependent on a first data rate in the one round and in the first band;
   commencing transmitting, by the transmitter, a first frame of data over the first band at the first data rate; and
   waiting for the computed target spacing to elapse, and then commencing transmitting, by the transmitter, a second frame of data over the second band at a second data rate,
   wherein each band and each round of the band have a different data rate, and
   wherein the size of each frame in the round is equal to a constant slot length multiplied by the data rate in the round and in the band over which the frame is transmitted.

2. The method of claim 1, further comprising, simultaneously with the commencing transmitting the first frame, commencing loading a next frame to be transmitted in the next round over the first band at a loading rate.

3. The method of claim 2, wherein the constant slot length is at least the ratio of the maximum over all rounds of the sum over all bands of the frame sizes to the minimum of the loading rate and an unloading rate of received frames at the receiver.

4. The method of claim 3, wherein the waiting for the computed target spacing to elapse comprises:
   waiting until the transmission of a previous frame of data over the second band is complete;
   computing a target delay, wherein the target delay is computed as the difference between the sum of the start time of transmission in the first band and the computed target spacing and the current time; and
   waiting for the computed target delay to elapse.

5. The method of claim 2, wherein the waiting for the computed target spacing to elapse comprises:
   waiting until the transmission of a previous frame of data over the second band is complete;
   computing a target delay, wherein the target delay is computed as the difference between the sum of the start time of transmission in the first band and the computed target spacing and the current time; and
   waiting for the computed target delay to elapse.

6. The method of claim 5, further comprising determining whether the computed target delay is less than a slot tolerance in the first band in the previous round, wherein the waiting is performed dependent on the determining, and wherein the slot tolerance in a band and a round is equal to the ratio of a frame size granularity to the data rate in the band in the round.

7. The method of claim 1, wherein the computing the target spacing comprises computing the maximum data rate in the first band over all rounds, divided by the sum over all bands of the maximum data rate in each band over all rounds, multiplied by the constant slot length.

8. The method of claim 7, wherein the waiting for the computed target spacing to elapse comprises:
   waiting until the transmission of a previous frame of data over the second band is complete;
   computing a target delay, wherein the target delay is computed as the difference between the sum of the start time of transmission in the first band and the computed target spacing and the current time; and
   waiting for the computed target delay to elapse.

9. The method of claim 1, wherein the waiting for the computed target spacing to elapse comprises:
   waiting until the transmission of a previous frame of data over the second band is complete;
   computing a target delay, wherein the target delay is computed as the difference between the sum of the start time of transmission in the first band and the computed target spacing and the current time; and
   waiting for the computed target delay to elapse.

10. The method of claim 9, further comprising determining whether the computed target delay is less than a slot tolerance in the first band in the previous round, wherein the waiting is performed dependent on the determining, and wherein the slot tolerance in a band and a round is equal to the ratio of a frame size granularity to the data rate in the band in the round.

11. The method of claim 10, wherein, when the computed target delay is less than the slot tolerance, the size of the first frame is equal to the sum of a constant slot length and the computed target delay, multiplied by the data rate in the round and in the corresponding band, rounded to the nearest multiple of the frame size granularity, and the waiting is not performed.

12. The method of claim 10, wherein, when the computed target delay is not less than slot tolerance, the size of the first frame is equal to a constant slot length multiplied by the data rate in the round and in the corresponding band, rounded to the nearest multiple of the frame size granularity.

13. The method of 1, wherein the waiting for the computed target spacing to elapse comprises:
   waiting until the transmission of a previous frame of data over the second band is complete;
   computing a target delay, wherein the target delay is computed as the difference between the sum of the start time of transmission in the first band and the computed target spacing and the current time; and
   waiting for the computed target delay to elapse.

14. The method of claim 13, further comprising determining whether the computed target delay is less than a slot tolerance in the first band in the previous round, wherein the waiting is performed dependent on the determining, and wherein the slot tolerance in a band and a round is equal to the ratio of a frame size granularity to the data rate in the band in the round.

15. The method of claim 13, wherein, when the computed target delay is less than the slot tolerance, the size of the first frame is equal to the sum of a constant slot length and the computed target delay, multiplied by the data rate in the round and in the corresponding band, rounded to the nearest multiple of the frame size granularity, and the waiting is not performed.

16. The method of claim 13, wherein, when the computed target delay is not less than slot tolerance, the size of the first frame is equal to a constant slot length multiplied by the data rate in the round and in the corresponding band, rounded to the nearest multiple of the frame size granularity.

17. A transmitter comprising:
   a processor configured to compute a target spacing in time between a start time of transmission in a first band and a start time of transmission in a second band dependent on a first data rate in the first band; and
   a switch configured to:
   commence transmitting a first frame of data from a first buffer over the first band at the first data rate and
   wait for the computed target spacing to elapse, and then commence transmitting a second frame of data from a second buffer over the second band at a second data rate,
   wherein each band and each round of the band have a different data rate, and
   wherein the size of each frame in the round is equal to a constant slot length multiplied by the data rate in the round and in the band over which the frame is transmitted.

18. The transmitter of claim 17, further comprising a switch configured to, simultaneously with the commencement of transmitting of the first frame, commence loading the second frame of data into the second buffer.

* * * * *

UNITED STATES PATENT AND TRADEMARK OFFICE
CERTIFICATE OF CORRECTION

PATENT NO. : 9,860,894 B2
APPLICATION NO. : 14/648465
DATED : January 2, 2018
INVENTOR(S) : Ren Ping Liu et al.

Page 1 of 1

It is certified that error appears in the above-identified patent and that said Letters Patent is hereby corrected as shown below:

In the Specification

Column 6, Line 13, reads "delay of a seconds" and should be -- delay of $\sigma$ seconds --.

Signed and Sealed this
Fourteenth Day of August, 2018

Andrei Iancu
*Director of the United States Patent and Trademark Office*